(12) United States Patent
Shah et al.

(10) Patent No.: US 10,424,302 B2
(45) Date of Patent: Sep. 24, 2019

(54) TURN-BASED REINFORCEMENT LEARNING FOR DIALOG MANAGEMENT

(71) Applicant: Google LLC, Mountain View, CA (US)

(72) Inventors: Pararth Shah, Mountain View, CA (US); Larry Paul Heck, Los Altos, CA (US); Dilek Hakkani-Tur, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 59 days.

(21) Appl. No.: 15/782,333

(22) Filed: Oct. 12, 2017

(65) Prior Publication Data

US 2019/0115027 A1   Apr. 18, 2019

(51) Int. Cl.
| | | |
|---|---|---|
| *G10L 15/00* | (2013.01) |
| *G10L 15/16* | (2006.01) |
| *G10L 15/30* | (2013.01) |
| *G10L 17/22* | (2013.01) |
| *H04L 12/58* | (2006.01) |
| *G06F 16/9032* | (2019.01) |

(52) U.S. Cl.
CPC ........ *G10L 15/30* (2013.01); *G06F 16/90332* (2019.01); *G10L 15/005* (2013.01); *G10L 15/16* (2013.01); *G10L 17/22* (2013.01); *H04L 51/02* (2013.01)

(58) Field of Classification Search
CPC ....... G10L 15/00; G10L 15/26; G10L 15/265; G10L 15/30; G06F 17/27
See application file for complete search history.

(56) References Cited

U.S. PATENT DOCUMENTS 10,032,463 B1 * 7/2018 Rastrow ................ G10L 15/183
2006/0206337 A1 * 9/2006 Paek ..................... G10L 15/065
704/275

(Continued)

OTHER PUBLICATIONS

Su, Pei-Hao, et al. "Learning from real users: Rating dialogue success with neural networks for reinforcement learning in spoken dialogue systems." arXiv preprint arXiv:1508.03386 (2015). (Year: 2015).*

(Continued)

*Primary Examiner* — Paras D Shah
(74) *Attorney, Agent, or Firm* — Middleton Reutlinger

(57) ABSTRACT

Techniques are described related to turn-based reinforcement learning for dialog management. In various implementations, dialog states and corresponding responsive actions generated during a multi-turn human-to-computer dialog session may be obtained. A plurality of turn-level training instances may be generated, each including: a given dialog state of the plurality of dialog states at an outset of a given turn of the human-to-computer dialog session; and a given responsive action that was selected based on the given dialog state. One or more of the turn-level training instances may further include a turn-level feedback value that reflects on the given responsive action selected during the given turn. A reward value may be generated based on an outcome of the human-to-computer dialog session. The dialog management policy model may be trained based on turn-level feedback values of the turn-level training instance(s) and the reward value.

16 Claims, 5 Drawing Sheets

(56) References Cited

U.S. PATENT DOCUMENTS

| | | | | |
|---|---|---|---|---|
| 2012/0053945 | A1* | 3/2012 | Gupta | G10L 15/22 704/256 |
| 2015/0066479 | A1* | 3/2015 | Pasupalak | G06F 17/27 704/9 |
| 2015/0095033 | A1* | 4/2015 | Boies | G10L 15/1815 704/257 |
| 2015/0169553 | A1* | 6/2015 | Watanabe | G06F 16/90332 704/9 |
| 2015/0363393 | A1* | 12/2015 | Williams | G06F 17/289 704/8 |
| 2017/0140755 | A1* | 5/2017 | Andreas | G06F 17/241 |
| 2017/0330077 | A1* | 11/2017 | Williams | G06F 17/278 |
| 2017/0330556 | A1* | 11/2017 | Fatemi Booshehri | G10L 15/063 |
| 2018/0052825 | A1* | 2/2018 | Lipton | G06F 17/279 |
| 2018/0053119 | A1* | 2/2018 | Zeng | G06F 17/30654 |
| 2018/0226076 | A1* | 8/2018 | Kotti | G10L 15/22 |
| 2018/0233128 | A1* | 8/2018 | Chen | G10L 15/063 |
| 2018/0233143 | A1* | 8/2018 | Papangelis | G10L 15/22 |

OTHER PUBLICATIONS

Su, Pei-Hao, et al. "On-line active reward learning for policy optimisation in spoken dialogue systems." arXiv preprint arXiv:1605.07669 (2016). (Year: 2016).*

Wen, Tsung-Hsien, et al. "A network-based end-to-end trainable task-oriented dialogue system." arXiv preprint arXiv:1604.04562 (2016). (Year: 2016).*

Liu, Bing, and Ian Lane. "Iterative policy learning in end-to-end trainable task-oriented neural dialog models." Automatic Speech Recognition and Understanding Workshop (ASRU), 2017 IEEE. IEEE, 2017. (Year: 2017).*

Zhao, Tiancheng, and Maxine Eskenazi. "Towards end-to-end learning for dialog state tracking and management using deep reinforcement learning." arXiv preprint arXiv:1606.02560 (2016). (Year: 2016).*

Su, Pei-Hao, et al. "Continuously learning neural dialogue management." arXiv preprint arXiv:1606.02689 (2016). (Year: 2016).*

Lee, Byung-Jun, et al. "Optimizing generative dialog state tracker via cascading gradient descent." Proceedings of the 15th Annual Meeting of the Special Interest Group on Discourse and Dialogue (SIGDIAL). 2014. (Year: 2014).*

He, Ji, et al. "Deep reinforcement learning with a natural language action space." arXiv preprint arXiv:1511.04636 (2015). (Year: 2015).*

Schatzmann, J., et al.; Agenda-Based User Simulation for Bootstrapping a Pomdp Dialogue System; In Human Language Technologies 2007: The Conference of the North American Chapter of the Association for Computational Linguistics; Companion Volume, Short Papers, pp. 149-152; UK; dated 2007.

Wen, T-H, et al.; A network-based end-to-end trainable task-oriented dialogue system.; Cambridge University Engineering Department; 12 Pages; UK; dated 2016.

Levin, E.; et al.; A Stochastic Model of Computer-human Interaction for Learning Dialogue Strategies; AT&T Labs—Research; US; 4 Pages; dated 1997.

Loftin, R.; et al.; A Strategy-Aware Technique for Learning Behaviors from Discrete Human Feedback; AAAI Conference on Artificial Intelligence; pp. 937-943; dated 2014.

Su, P.-H, et al.; Continuously Learning Neural Dialogue Management; Department of Engineering, University of Cambridge; 6 Pages; UK; dated 2016.

Koos, S., et al.; Crossing the Reality Gap in Evolutionary Robotics by Promoting Transferable Controllers; 12th Annual Conference on Genetic and Evolutionary Computation; 9 Pages; UA; dated 2010.

Suay, H. B., et al.; Effect of Human Guidance and State Space Size on Interactive Reinforcement Learning; Ro-Man; 6 Pages; dated 2011.

Lai, M.; Giraffe: Using Deep Reinforcement Learning to Play Chess; Imperial College London Department of Computing; p. 1-39; London; dated Sep. 2015.

Hu, Z., et al; Harnessing Deep Neural Networks with Logic Rules; School of Computer Science, Carnegie Mellon University; p. 1-20; dated 2016.

Knox, W. B., et al.; How Humans Teach Agents; International Journal of Social Robotics; 13 Pages; dated 2012.

Pietquin, O.; Inverse Reinforcement Learning for Interactive Systems; 2nd Workshop on Machine Learning for Interactive Systems: Bridging the Gap Between Perception, Action and Comminication; pp. 71-75; dated 2013.

Goldwasser, D.; Learning from Natural Instructions; Machine Learning; 114 Pages; US; dated 2014.

Silver, D., et al.; Mastering the Game of Go with Deep Neural Networks and Tree Search; Nature; 20 Pages; dated 2016.

Su, P.-H, et al.; On-line Active Reward Learning for Policy Optimisation in Spoken Dialogue Systems; Department of Engineering—University of Cambridge; 11 Pages; UK; dated 2016.

Gasic, M.; On-line Policy Optimisation of Bayesian Spoken Dialogue Systems via Human Interaction; Cambridge Universtiy Engineering Department; 5 Pages; dated 2013.

Williams, J.; Partially Observable Markov Decision Processes for Spoken Dialogue Management; Churchill College and Cambridge University Engineering Department; 138 Pages; dated Apr. 2006.

Mnih, V.; Playing Atari with Deep Reinforcement Learning; DeepMind Thechnologies; pp. 1-9; dated 2013.

Fatemi, M.; Policy Networks with Two-Stage Training for Dialogue Systems; Maluuba Research; 10 Pages; CA; dated 2016.

Gasic, M.; Policy Optimisation of Pomdp-Based Dialogue Systems without State Space Compression; Cambridge; 6 Pages; UK; dated 2012.

Griffith, S.; Policy Shaping: Integrating Human Feedback with Reinforcement Learning; Georgia Institute of Technology; 9 Pages; US; dated 2013.

Cederborg, T.; Policy Shaping with Human Teachers; In Proceedings of the Twenty-Fourth International Joint Conference on Artificial Intelligence; pp. 3366-3372; dated 2015.

Sutton, R. S., et al.; Reinforcement Learning: An Introduction; MIT Press; 10 Pages; US; dated 1998.

Knox, W., et al.; Reinforcement Learning from Simultaneous Human and MDP Reward; University of Texas; 8 Pages; US; dated 2012.

Thomaz, A. L.; et al.; Reinforcement Learning With Human Teachers: Understanding How People Want to Teach Robots; MIT Media Laboratory; 6 Pages; US; dated 2006.

Thomaz, A. L.; et al.; Real-time Interactive Reinforcement Learning for Robots; MIT Media Lab; 5 Pages; US; dated 2005.

Biber, D.; on the Complexity of Discourse Complexity: A Multidimensional Analysis; Northern Arizona University; pp. 133-163; US; dated 1992.

Cuayahuitl, H.; A Simple Deep Reinforcement Learning Dialogue System; pp. 1-6; dated 2016.

Williams, R. J.; Simple Statistical Gradient-Following Algorithms for Connectionist Reinforcement Learning; College of Computer Science; pp. 5-32; US; dated 1992.

Cuayahuitl, H. et al.; Strategic Dialogue Management via Deep Reinforcement Learning; Heriot-Watt University; pp. 1-10; Edinburgh; dated 2015.

Browne, C. B., et al.; A Survey of Monte Carlo Tree Search Methods; pp. 1-49; dated Mar. 2012.

Schatzmann, J. et al.; The Hidden Agenda User Simulation Model; pp. 733-747; dated 2009.

Zhao, T. et al.; Towards End-To-End Learning for Dialog State Tracking and Management Using Deep Reinforcement Learning; Carnegie Mellon University; 10 Pages; dated Sep. 2016.

Dhingra, B.; et al.; End-to-end Reinforcement Learning of Dialogue Agents for Information Access; 12 Pages; dated 2016.

Young, S.; Using POMDPS for Dialog Management; MIT—Cambridge University Engineering Department; 23 Pages; dated 2006.

* cited by examiner

TURN-BASED REINFORCEMENT LEARNING FOR DIALOG MANAGEMENT

BACKGROUND

Humans may engage in human-to-computer dialogs with interactive software applications referred to herein as "automated assistants" (also referred to as "chat bots," "interactive personal assistants," "intelligent personal assistants," "personal voice assistants," "conversational agents," etc.). For example, humans (which when they interact with automated assistants may be referred to as "users") may provide commands, queries, and/or requests using spoken natural language input (i.e. utterances) which may in some cases be converted into text and then processed, and/or by providing textual (e.g., typed) natural language input.

Users may engage in human-to-computer dialog sessions with automated assistants to complete a variety of tasks such as finding a restaurant or booking movie tickets through natural language interactions. A "dialog manager," also referred to as dialog management policy, is often the decision-making component of an automated assistant, and may choose responsive actions at each step or "turn" to guide the human-to-computer dialog session to successful task completion. The responsive actions may include interacting with the user to, for instance, obtain specific requirements for accomplishing the task (i.e. slot filling), as well as negotiating and offering alternatives.

Reinforcement learning has been used successfully in a variety of discrete action domains. For example, reinforcement learning has been used to train decision-making models, or "playing agents," to play a variety of relatively simple video games. While efforts have been made to utilize reinforcement learning to train dialog managers employed by automated assistants, dialog management presents different challenges than video games. A playing agent for playing a video game may only be trained on a handful of available moves, such as up, down, left, right, etc. A video game episode may be relatively large in depth, i.e. may include a relatively large number of discrete steps (e.g., moves), but each individual step makes a relatively small change in the state of the environment. By contrast, dialog management, and particularly task-oriented dialog, usually only consists of a relatively small number of discrete steps (referred to as "turns" herein), and actions performed during each turn can dramatically alter a state of the dialog session. Consequently, mistakes by a dialog manager are both costlier and more temporally localized compared to mistakes in other reinforcement learning domains.

In some respects, dialog management is similar to strategy games (e.g., Go, chess), which require long term planning because each individual move has a relatively large impact in the game state. Successful efforts have been made to train playing agents to play such games using aspects of reinforcement learning. However, dialog management is different than strategy games because it is essentially an asymmetric, imperfect information game with no predefined rules. Consequently, it is difficult to collect large, high quality data sets of dialogs with expert human agents and real users for every kind of task and/or user behavior that the dialog system may be expected to handle. And because dialog management is asymmetric, it is not straightforward to apply self-play to exhaustively explore the game tree. Additionally, the flexibility of human conversations and lack of precise models of user goals and behavior make it laborious to engineer a realistic user simulator. Moreover, uncertainty over a user's goals and strict latency expectations for a real-time dialog agent make it difficult to leverage Monte Carlo tree search rollouts at inference time.

SUMMARY

Techniques are described herein for turn-based reinforcement learning for dialog management. In various implementations, a dialog management policy model employed by a dialog manager component of an automated assistant may be trained directly and/or indirectly based on multiple independent signals. A first signal may be a reward value determined at the end of each human-to-computer dialog session that is determined based on satisfaction and/or dissatisfaction of a user's goal(s). In some implementations, this reward value may be used as, or to generate, a policy gradient that is then used to train at least a portion ($\pi_R$ below) of the dialog management policy model, such as a feedforward neural network, to optimize the reward value.

A second signal may include one or more turn-level reward values that are determined at each turn, e.g., based on turn-level user feedback that is provided by a user and/or observed. This turn-level feedback may be explicit, e.g., the user may say, "no, that isn't what I wanted," or "that is correct." Additionally or alternatively, this turn-level feedback may be implicit, e.g., based on an intonation of the user's voice, the user abruptly changing the subject, the user responding directly to a request to provide slot values, a visual reaction by the user captured by a camera, etc. In some implementations, the turn-level feedback values may be used to train another portion of the dialog management policy model referred to herein as a "turn-level model" (denoted $\pi_F$ below). In various implementations, at each subsequent turn of a human-to-computer dialog session, one of a plurality of dialog states may be applied as input across the feedforward neural network to generate a plurality of probabilities used for stochastic selection of a responsive action. The plurality of probabilities may then be adjusted based on the turn-level model before the responsive action is stochastically selected.

Techniques described herein may give rise to a variety of technical advantages. While traditional reinforcement learning may be used to train a dialog management policy model based on reward values generated at the end of each human-to-computer dialog session, this training may require considerable time and/or computing resources, as well as a potentially inordinate amount of training data. By contrast, using techniques described herein allows the search space at each dialog turn to be pruned based on turn-level feedback. Consequently, time and/or computing resources required for training such as memory, processing cycles, etc., may be preserved. Moreover, the amount of training data required to adequately train the model may be reduced, at least relative to traditional techniques of reinforcement learning. Additionally, training at least a part of a dialog management policy model using turn-level feedback, as opposed to only using reward values generated at the end of each completed dialog session, may enable an automated assistant to appear more "humanlike" and be more responsive to users' needs, thereby preserving computing resources that might otherwise be required to achieve user goal(s).

In some implementations, a method performed by one or more processors is provided that includes: obtaining a plurality of dialog states and corresponding responsive actions generated during a multi-turn, free-form human-to-computer dialog session between a user and an automated assistant, wherein one of the plurality of dialog states is applied as input across a dialog management policy model at each turn of the human-to-computer dialog session to select a corresponding one of the plurality of responsive actions to be performed by the automated assistant; generating a plurality of turn-level training instances, wherein each turn-level training instance of the plurality of turn-level training instances includes: a given dialog state of the plurality of dialog states at an outset of a given turn of the human-to-computer dialog session; and a given responsive action of the plurality of responsive actions that was selected based on the given dialog state during the given turn; wherein one or more of the plurality of turn-level training instances further includes a turn-level feedback value that reflects on the given responsive action selected during the given turn; generating a reward value based on an ultimate outcome of the human-to-computer dialog session; and training the dialog management policy model based on turn-level feedback values of the one or more turn-level training instances and the reward value.

These and other implementations of technology disclosed herein may optionally include one or more of the following features.

In various implementations, the reward value may be determined based on an indication of whether a task desired by the user was performed as a result of the human-to-computer dialog session and a number of turns that occurred during the human-to-computer dialog session. In various implementations, the dialog management policy model may include a feedforward neural network. In various implementations, the dialog management model may include a turn-level model that is separate from the feedforward neural network.

In various implementations, training the dialog management model may include: determining a single policy gradient based on the reward value; independently applying each of the turn-level training instances as input across the feedforward neural network model to determine respective output probabilities associated with a plurality of responsive actions; and for each instance of independently applying, adjusting the respective output probabilities based on the single policy gradient. In various implementations, the adjusting may include applying back propagation across the dialog management model. In various implementations, training the dialog management model may further include updating the turn-level model based on the one or more turn-level feedback values associated with the plurality of turn-level training instances. In various implementations, at each turn of the human-to-computer dialog session, one of the plurality of dialog states may be applied as input across the feedforward neural network to generate a plurality of probabilities used for stochastic selection of a responsive action, and the plurality of probabilities may be adjusted based on the turn-level model before the responsive action is stochastically selected.

In various implementations, the turn-level feedback value may be indicative of a reaction by the user to the given responsive action. In various implementations, the reward value may be generated further based on the one or more feedback values associated with the plurality of turn-level training instances.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
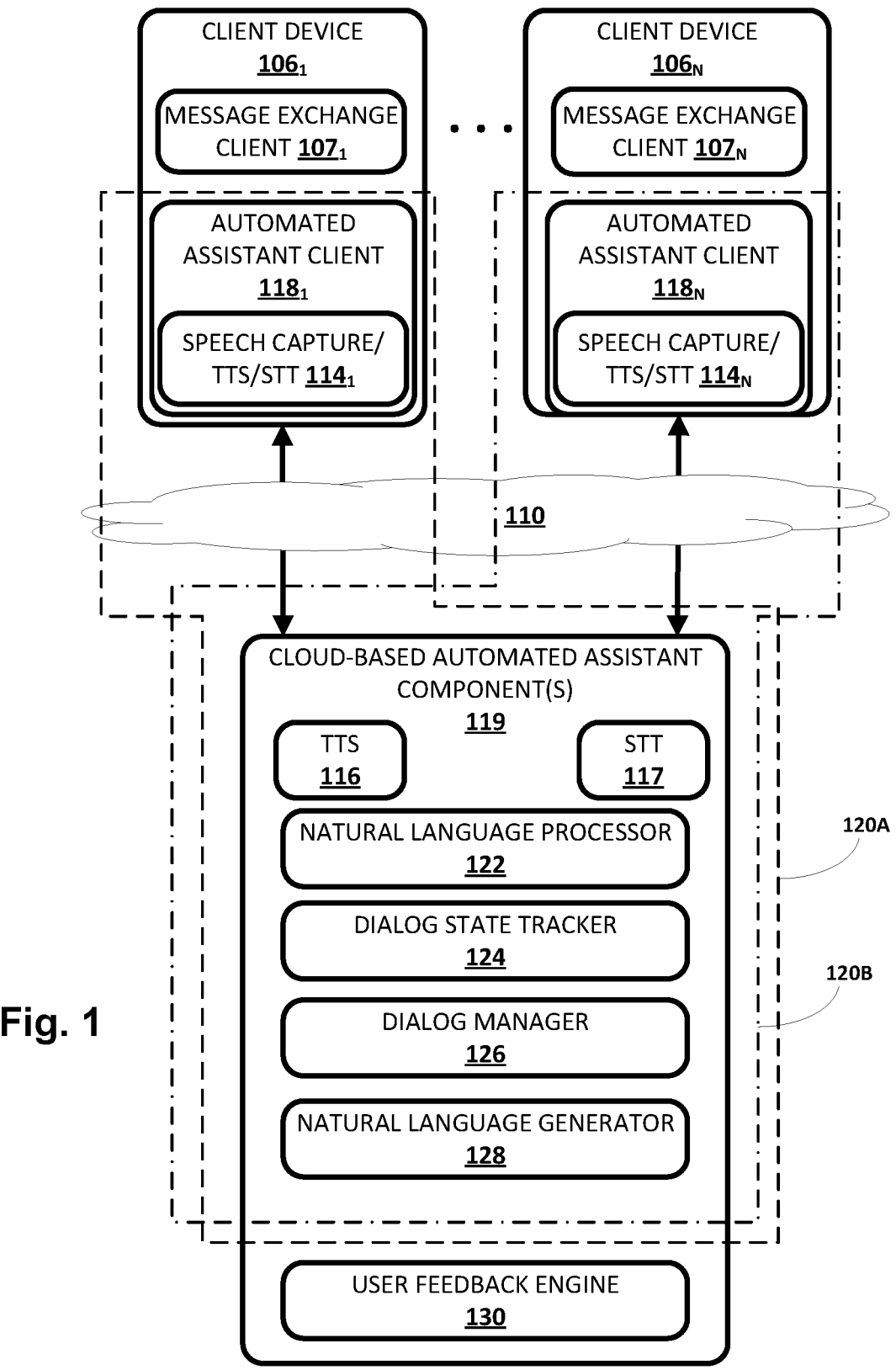
FIG. 1 is a block diagram of an example environment in which implementations disclosed herein may be implemented.

Now turning to FIG. 1, an example environment in which techniques disclosed herein may be implemented is illustrated. The example environment includes a plurality of client computing devices $106_{1-N}$. Each client device 106 may execute a respective instance of an automated assistant client 118. One or more cloud-based automated assistant components 119, such as a natural language processor 122, may be implemented on one or more computing systems (collectively referred to as a "cloud" computing system) that are communicatively coupled to client devices $106_{1-N}$ via one or more local and/or wide area networks (e.g., the Internet) indicated generally at 110.

As noted in the background, an instance of an automated assistant client 118, by way of its interactions with one or more cloud-based automated assistant components 119, may form what appears to be, from the user's perspective, a logical instance of an automated assistant 120 with which the user may engage in a human-to-computer dialog. Two instances of such an automated assistant 120 are depicted in FIG. 1. A first automated assistant 120A encompassed by a dashed line serves a first user (not depicted) operating first client device $106_1$ and includes automated assistant client $118_1$ and one or more cloud-based automated assistant components 119. A second automated assistant 120B encompassed by a dash-dash-dot line serves a second user (not depicted) operating another client device $106_N$ and includes automated assistant client $118_N$ and one or more cloud-based automated assistant components 119. It thus should be understood that in some implementations, each user that engages with an automated assistant client 118 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 118 executing on a client device 106 operated by the user and one or more cloud-based automated assistant components 119 (which may be shared amongst multiple automated assistant clients 118). It should also be understood that in some implementations, automated assistant 120 may respond to a request from any user regardless of whether the user is actually "served" by that particular instance of automated assistant 120.

The client devices 106$_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided.

In various implementations, each of the client computing devices 106$_{1-N}$ may operate a variety of different applications, such as a corresponding one of a plurality of message exchange clients 107$_{1-N}$. Message exchange clients 107$_{1-N}$ may come in various forms and the forms may vary across the client computing devices 106$_{1-N}$ and/or multiple forms may be operated on a single one of the client computing devices 106$_{1-N}$. In some implementations, one or more of the message exchange clients 107$_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with automated assistant 120, and so forth. In some implementations, one or more of the message exchange clients 107$_{1-N}$ may be implemented via a webpage or other resources rendered by a web browser (not depicted) or other application of client computing device 106.

As described in more detail herein, automated assistant 120 engages in human-to-computer dialog sessions with one or more users via user interface input and output devices of one or more client devices 106$_{1-N}$. In some implementations, automated assistant 120 may engage in a human-to-computer dialog session with a user in response to user interface input provided by the user via one or more user interface input devices of one of the client devices 106$_{1-N}$. In some of those implementations, the user interface input is explicitly directed to automated assistant 120. For example, one of the message exchange clients 107$_{1-N}$ may be a personal assistant messaging service dedicated to conversations with automated assistant 120 and user interface input provided via that personal assistant messaging service may be automatically provided to automated assistant 120. Also, for example, the user interface input may be explicitly directed to automated assistant 120 in one or more of the message exchange clients 107$_{1-N}$ based on particular user interface input that indicates automated assistant 120 is to be invoked. For instance, the particular user interface input may be one or more typed characters (e.g., @AutomatedAssistant), user interaction with a hardware button and/or virtual button (e.g., a tap, a long tap), an oral command (e.g., "Hey Automated Assistant"), and/or other particular user interface input.

In some implementations, automated assistant 120 may engage in a dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, automated assistant 120 may engage interactive voice response ("IVR"), such that the user can utter commands, searches, etc., and the automated assistant may utilize natural language processing and/or one or more grammars to convert the utterances into text, and respond to the text accordingly. In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of the client computing devices 106$_{1-N}$ and computing device(s) operating cloud-based automated assistant components 119 may include one or more memories for storage of data and software applications, one or more processors for accessing data and executing applications, and other components that facilitate communication over a network. The operations performed by one or more of the client computing devices 106$_{1-N}$ and/or by automated assistant 120 may be distributed across multiple computer systems. Automated assistant 120 may be implemented as, for example, computer programs running on one or more computers in one or more locations that are coupled to each other through a network.

As noted above, in various implementations, each of the client computing devices 106$_{1-N}$ may operate an automated assistant client 118. In various implementations, each automated assistant client 118 may include a corresponding speech capture/text-to-speech ("TTS")/STT module 114. In other implementations, one or more aspects of speech capture/TTS/STT module 114 may be implemented separately from automated assistant client 118.

Each speech capture/TTS/STT module 114 may be configured to perform one or more functions: capture a user's speech, e.g., via a microphone (which in some cases may comprise presence sensor 105); convert that captured audio to text (and/or to other representations or embeddings); and/or convert text to speech. For example, in some implementations, because a client device 106 may be relatively constrained in terms of computing resources (e.g., processor cycles, memory, battery, etc.), the speech capture/TTS/STT module 114 that is local to each client device 106 may be configured to convert a finite number of different spoken phrases—particularly phrases that invoke automated assistant 120—to text (or to other forms, such as lower dimensionality embeddings). Other speech input may be sent to cloud-based automated assistant components 119, which may include a cloud-based TTS module 116 and/or a cloud-based STT module 117.

Cloud-based STT module 117 may be configured to leverage the virtually limitless resources of the cloud to convert audio data captured by speech capture/TTS/STT module 114 into text (which may then be provided to natural language processor 122). Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture/ TTS/STT module 114, which may then convert the textual data into computer-generated speech that is output locally.

Automated assistant 120 (and in particular, cloud-based automated assistant components 119) may include a natural language processor 122, the aforementioned TTS module 116, the aforementioned STT module 117, a dialog state tracker 124, a dialog manager 126, and a natural language generator 128 (which in some implementations may be combined with TTS module 116). In some implementations, one or more of the engines and/or modules of automated assistant 120 may be omitted, combined, and/or implemented in a component that is separate from automated assistant 120.

In some implementations, automated assistant 120 generates responsive content in response to various inputs generated by a user of one of the client devices 106$_{1-N}$ during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in in response to free-form natural language input provided via one of the client devices 106$_{1-N}$. As used herein, free-form input is input that is formulated by a user and that is not constrained to a group of options presented for selection by the user.

As used herein, a "dialog session" may include a logically-self-contained exchange of one or more messages between a user and automated assistant 120 (and in some cases, other human participants) and/or performance of one or more responsive actions by automated assistant 120. Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

Natural language processor 122 (alternatively referred to as a "natural language understanding engine") of automated assistant 120 processes free form natural language input generated by users via client devices 106$_{1-N}$ and in some implementations may generate annotated output for use by one or more other components of automated assistant 120. For example, the natural language processor 122 may process natural language free-form input that is generated by a user via one or more user interface input devices of client device 106$_1$. The generated annotated output may include one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger (not depicted) configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

In the context of task-oriented dialog, natural language processor 122 may be configured to map free form natural language input provided by a user at each turn of a dialog session to a semantic representation that may be referred to herein as a "dialog act." Semantic representations, whether dialog acts generated from user input other semantic representations of automated assistant utterances, may take various forms. In some implementations, semantic representations may be modeled as discrete semantic frames. In other implementations, semantic representations may be formed as vector embeddings, e.g., in a continuous semantic space. While implementations described herein focus on the former, techniques described herein are equally applicable to the latter.

In some implementations, a dialog act (or more generally, a semantic representation) may be indicative of, among other things, one or more slot/value pairs that correspond to parameters of some action or task the user may be trying to perform via automated assistant 120. For example, suppose a user provides free form natural language input in the form: "Suggest an Indian restaurant for dinner tonight." In some implementations, natural language processor 122 may map that user input to a dialog act that includes, for instance, parameters such as the following: intent(find_restaurant); inform(cuisine=Indian, meal=dinner, time=tonight). Dialog acts may come in various forms, such as "greeting" (e.g., invoking automated assistant 120), "inform" (e.g., providing a parameter for slot filling), "intent" (e.g., find an entity, order something), request (e.g., request specific information about an entity), "confirm," "affirm," and "thank_you" (optional, may close a dialog session and/or be used as positive feedback and/or to indicate that a positive reward value should be provided). These are just examples and are not meant to be limiting.

In some implementations, a separate natural language understanding engine (not depicted) may handle this portion of dialog management, while natural language processor 122 handles the portions of natural language processing described above.

Dialog state tracker 124 may be configured to keep track of a "dialog state" that includes, for instance, a belief state of a user's goal (or "intent") over the course of a human-to-computer dialog session (and/or across multiple dialog sessions). In determining a dialog state, some dialog state trackers may seek to determine, based on user and system utterances in a dialog session, the most likely value(s) for slot(s) that are instantiated in the dialog. Some techniques utilize a fixed ontology that defines a set of slots and the set of values associated with those slots. Some techniques additionally or alternatively may be tailored to individual slots and/or domains. For example, some techniques may require training a model for each slot type in each domain.

Dialog manager 126 may be configured to map a current dialog state, e.g., provided by dialog state tracker 124, to one or more "responsive actions" of a plurality of candidate responsive actions that are then performed by automated assistant 120. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 120 outputting additional natural language dialog. This responsive dialog may include, for instance, requests that the user provide parameters for some action (i.e., fill slots) that dialog state tracker 124 believes the user intends to perform. In some implementations, responsive actions may include actions such as "request" (e.g., seek parameters for slot filling), "offer" (e.g., suggest an action or course of action for the user), "select," "inform" (e.g., provide the user with requested information), "no match" (e.g., notify the user that the user's last input is not understood), and so forth.

In some implementations, dialog manager 126 may include a machine learning model such as a neural network. In some such implementations, the neural network may take the form of a feed-forward neural network, e.g., with two hidden layers followed by a softmax layer. However, other configurations of neural networks, as well as other types of machine learning models, may be employed. In some implementations in which dialog manager 126 employs a neural network, inputs to the neural network may include, but are not limited to, a user action, a previous responsive action (i.e., the action performed by dialog manager in the previous turn), a current dialog state (e.g., a binary vector provided by dialog state tracker 124 that indicates which slots have been filled), and a responsive action database state, which in some implementations may be encoded as a binary vector comprising flags which indicate if the responsive action database contains zero, one, two, or three and more results matching the constraints specified up to the current turn of the dialog session. The responsive actions database and training of dialog manager 126 in general will be described in more detail below.

In various implementations, dialog manager 126 may operate at the semantic representation level. For example, dialog manager 126 may receive a new observation in the form of a semantic dialog frame (which may include, for instance, a dialog act provided by natural language processor 122 and/or a dialog state provided by dialog state tracker 124) and stochastically select a responsive action from a plurality of candidate responsive actions. Natural language generator 128 may be configured to map the responsive action selected by dialog manager 126 to, for instance, one or more utterances that are provided as output to a user at the end of each turn of a dialog session. A dialog session may be considered successful (and may so reflected in a "reward value") if a user's goal/task is completed and all the user's information requests are satisfied. In some implementations, the reward value may be discounted by a number of turns in the dialog session, such that the more turns required to accomplish the user's task, the less the reward value.

User feedback engine 130 may be configured to detect user feedback at various points in time during the human-to-computer dialog session between the user and automated assistant 120. In some implementations, user feedback engine 130 may generate one or more turn-level feedback values that are indicative of, for instance, a reaction by the user to the given responsive action. User reactions may come in various forms. In some implementations, a user reaction may take the form of the user providing additional free-form natural language input that advances the dialog. If the free-form natural language input from the user appears to confirm that automated assistant 120 had correctly interpreted the user's intent (e.g., via user confirmation, user provision of requested slot values, etc.), that may be interpreted, e.g., by user feedback engine 130, as positive feedback (or in some cases, neutral feedback). If the free-form natural language input from the user corrects or admonishes automated assistant 120 or changes the course of the human-to-computer dialog, that may be interpreted, e.g., by user feedback engine 130, as negative feedback.

In some implementations, user feedback engine 130 may be configured to detect the user's sentiment using various cues. For example, in some implementations, user feedback engine 130 may detect an intonation of the user's voice, e.g., to determine whether the user sounds frustrated or exasperated (negative feedback), whether the user laughs or provides other indications of approval (positive feedback). In some implementations in which user device 106 that is used by the user to engage in the human-to-computer dialog session with automated assistant 120 is equipped with a camera, visual cues such as head nodding may be interpreted as positive feedback, head shaking, frowning, rolling eyes, etc. may be interpreted as negative feedback, and so forth.

In various implementations, user feedback may be used, e.g., by user feedback engine 130, to generate turn-level feedback values. In some implementations, these turn-level feedback values may be used to train a turn-level model (also referred to herein as $\pi_F$) of the dialog management model that is, for instance, separate from dialog manager's 126 current estimate $\pi_R$ of a policy that optimizes a reward signal from the user (and which, as noted above, may in some cases take the form a feedforward neural network). This turn-level model $\pi_F$ may take various forms. In some implementations, the turn-level model $\pi_F$ may take the form of a lookup table that tracks dialog state/responsive action pairs, and in particular tracks the number of positive and negative turn-level feedback values collected for each dialog state/responsive action pair. In some implementations, user feedback engine 130 may, for each dialog state/responsive action pair, maintain and store a running tally of positive turn-level feedback values versus negative turn-level feedback values. In some implementations, user feedback engine 130 may maintain this tally as a difference between positive and negative feedback values for each dialog state/responsive action pair. As will be described in more detail below, these running tallies may be used to adjust probabilities generated by, for instance, the feed-forward neural network used by dialog manager 126 at each turn. In other implementations, the turn-level model $\pi_F$ may be implemented using other data structures or models, such as a feed-forward neural network.

Figure 2A:
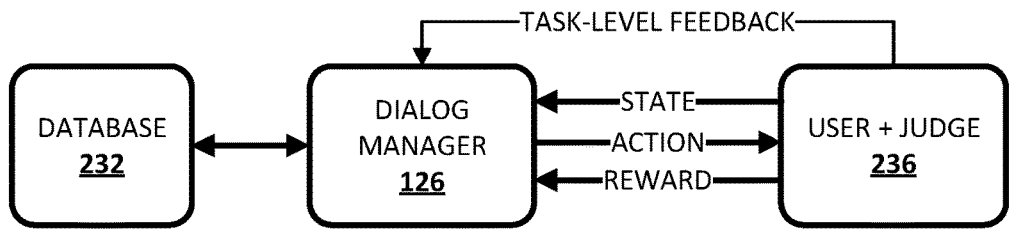
FIGS. 2A and 2B depict multiple ways in which a dialog manager may interact with other components described herein, in accordance with various implementations.
Figure 2B:
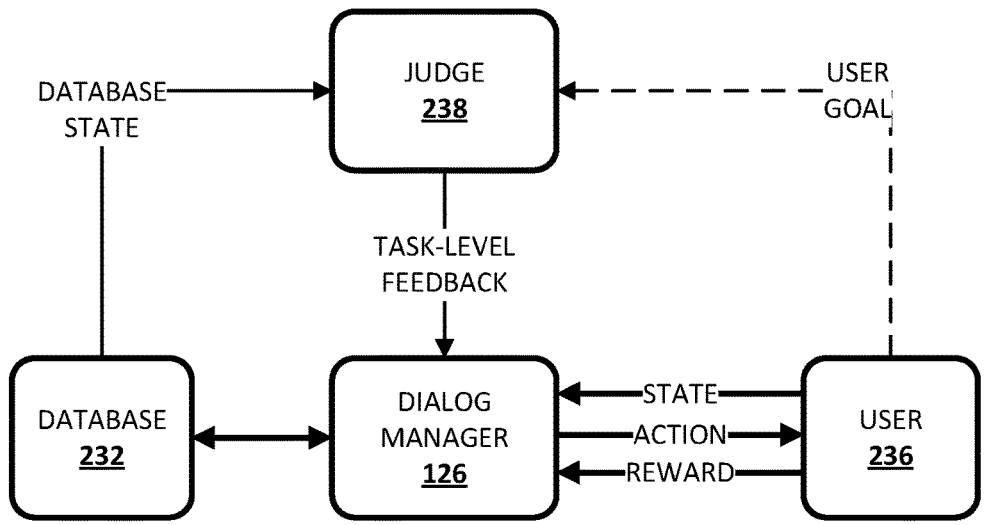

Turning now to FIGS. 2A and 2B, dialog manager 126 is depicted according to two different implementations of the present disclosure. In FIG. 2A, dialog manager 126 is in communication with a database 232 that includes, for instance, a list D of entities (e.g., responsive actions) and associated attributes (e.g., slots to be filled). In the implementation of FIG. 2A, database 232 may be hidden from a user 236 (or "user agent"). In various implementations, user 236 may have a goal, G, that is hidden from dialog manager 126. G may in effect assign a score to each entity in database 232, such as a 0 or a 1, such that $\forall d \in D: g(d) \rightarrow \{0,1\}$. G may be achieved if dialog manager 126 offers an entity with a score of 1 to user 236. As depicted in FIGS. 2A/2B, dialog manager 126 and user 236 interact using dialog acts which represent conversational actions, such as request, offer, confirm, etc. A human-to-computer dialog session, also referred to as an "episode," may consist of a complete dialog between user 236 and dialog manager 126, and the episode is successful if the goal G is achieved. At that point, dialog manager 126 receives a task-level reward, r.

In various implementations, a judge may provide turn-level feedback to dialog manager 126 during any given turn of the human-to-computer dialog session. In some implementations, turn-level feedback may be provided by the judge in real time, e.g., as the dialog occurs (i.e. interactively), and the turn-level model $\pi_F$ may be updated in real time. In other implementations, turn-level feedback may be accumulated over multiple turns (e.g., over an entire episode), and the turn-level model $\pi_F$ may be updated in batch mode. In FIG. 2A, the judge takes the form of observed user reaction from the user 236. In such case, the judge has access to the user's goal G (because the user is the judge) but not to database 232, and the turn-level feedback may take the form of, for instance, explicit statements from the user that indicates a responsive action performed by automated assistant 120 (e.g., selected by dialog manager 126) was correct (positive) or incorrect (negative). In some cases if the user continues the dialog session as expected, that may be taken as positive or neutral feedback. The configuration of FIG. 2A may represent the scenario in which a human user is providing feedback in real time to improve the system.

In FIG. 2B, by contrast, a third party judge 238 is employed to observe interactions between dialog manager 126 and user 236. In some cases the third party judge 238 may be a person observing the human-to-computer dialog session (or reviewing log(s) of session(s)) and rating the actions of dialog manager 126. In other implementations, third party judge 238 may be implemented using software. In FIG. 2B, third party judge 238 may have access to database 232 but not to the user's goal G, except for to the extent third party judge 238 may be able to infer from the dialog history.

The turn-level feedback F, which in some implementations may be in the form $F \in \{-1, +1\}$, may constitute a label on a current action taken by dialog manager 126 during a turn. It can be used to prune the search space explored by dialog manager 126 during each turn, focusing the exploration on actions that are likely to lead to successful dialogs and thereby increasing the frequency of achieving positive rewards during training. However, human feedback can be irregular and inconsistent. To account for this uncertainty in the correctness and completeness of feedback, consider $P_F(a|s)$ as the probability that responsive action a is the optimal action to take in dialog state s based on the explicit feedback received from judge 238. Turn-level model $\pi_F$ may cause responsive action(s) to be selected according to the feedback probability, i.e., $\pi_F(s,a) = P_F(a|s)$. The following equation may be used for estimating the optimality of a dialog state/responsive action pair, (s, a) based on turn-level feedback:

$$\pi_F(s, a) = P_F(s) = \frac{C^{\delta_{s,a}}}{C^{\delta_{s,a}} + (1-C)^{\delta_{s,a}}}$$

wherein $C:(0<C<1)$ is the probability that the feedback F is consistent with the optimal policy ($\pi_R$), and $\delta_{s,a}$ is the difference between positive and negative turn-level feedback values received for responsive action a in dialog state s. This formulation may be used to estimate $\pi_F$ based on the feedback. In some implementations, dialog manager 126 may sample actions according to the turn-level model $\pi_F$ in combination with a current estimate, $\pi_R$, of the policy that optimizes the reward signal from the user. For example, in some implementations, a combined policy $\pi$ may be determined at each turn, e.g., $\pi_R \times \pi_F$. Intuitively, in some implementations, probabilities generated via application of a dialog state to the aforementioned feedforward neural network (which has weights corresponding to $\pi_R$), which will be used to stochastically select a responsive action during the current turn, are adjusted, e.g., on the fly in accordance with $\pi_F$.

As alluded to above, the policy $\pi_R$ that optimizes the reward signal from the user may be trained at the end of each dialog session (or in the case of batch training from conversation logs, at the end of consideration of each dialog session). For example, in some implementations, a plurality of dialog state/responsive action pairs generated during a multi-turn, free-form human-to-computer dialog session between a user and automated assistant 120 may be collected and used to generated turn-level training instances. Each turn-level training instance of the plurality of turn-level training instances may include: a given dialog state of the plurality of dialog states at an outset of a given turn of the human-to-computer dialog session; and a given responsive action of the plurality of responsive actions that was selected based on the given dialog state during the given turn. In some cases, one or more of the plurality of turn-level training instances may further include a turn-level feedback value that reflects on the given responsive action selected during the given turn. In some implementations, turn-level training instances may only include turn-level feedback if there was evidence of user (or third party judge) reaction (positive or negative), or at least reaction that satisfies some threshold.

Based on an ultimate outcome of each human-to-computer dialog session—e.g., was the user's goal G satisfied?—a reward value may be generated, e.g., by user feedback engine 130 and/or by dialog manager 126. In various implementations, a single policy gradient may be determined based on the reward value. In some cases, the single policy gradient may simply be equal to the reward value. Then, each of the turn-level training instances, and more particularly, each dialog state thereof, may be independently applied as input across the policy $\pi_R$ (e.g., feedforward neural network model) to determine respective output probabilities associated with a plurality of responsive actions. For each instance of independently applying, the respective output probabilities may be adjusted (e.g., back propagated) based on the single policy gradient. In some implementations, the policy gradient may be reduced by some amount for earlier-occurring dialog state/responsive action pairs, e.g., so that early interactions are not weighted as heavily as later interactions. In some implementations, the number of turns in the human-to-computer dialog session may also be taken into account in determining the reward value.

Additionally or alternatively, in some implementations, the reward value (and hence, policy gradient) associated with a human-to-computer dialog session may itself be calculated for turn-level feedback received during the session. For example, turn-level feedback may be used to calculate a turn-level feedback value of, for instance, +0.5 or −0.5 on each turn. This turn-level feedback value may then be incorporated into the policy gradient update, and dialog manager 126 may sample actions in an ∈-greedy manner during training.

Figure 3:
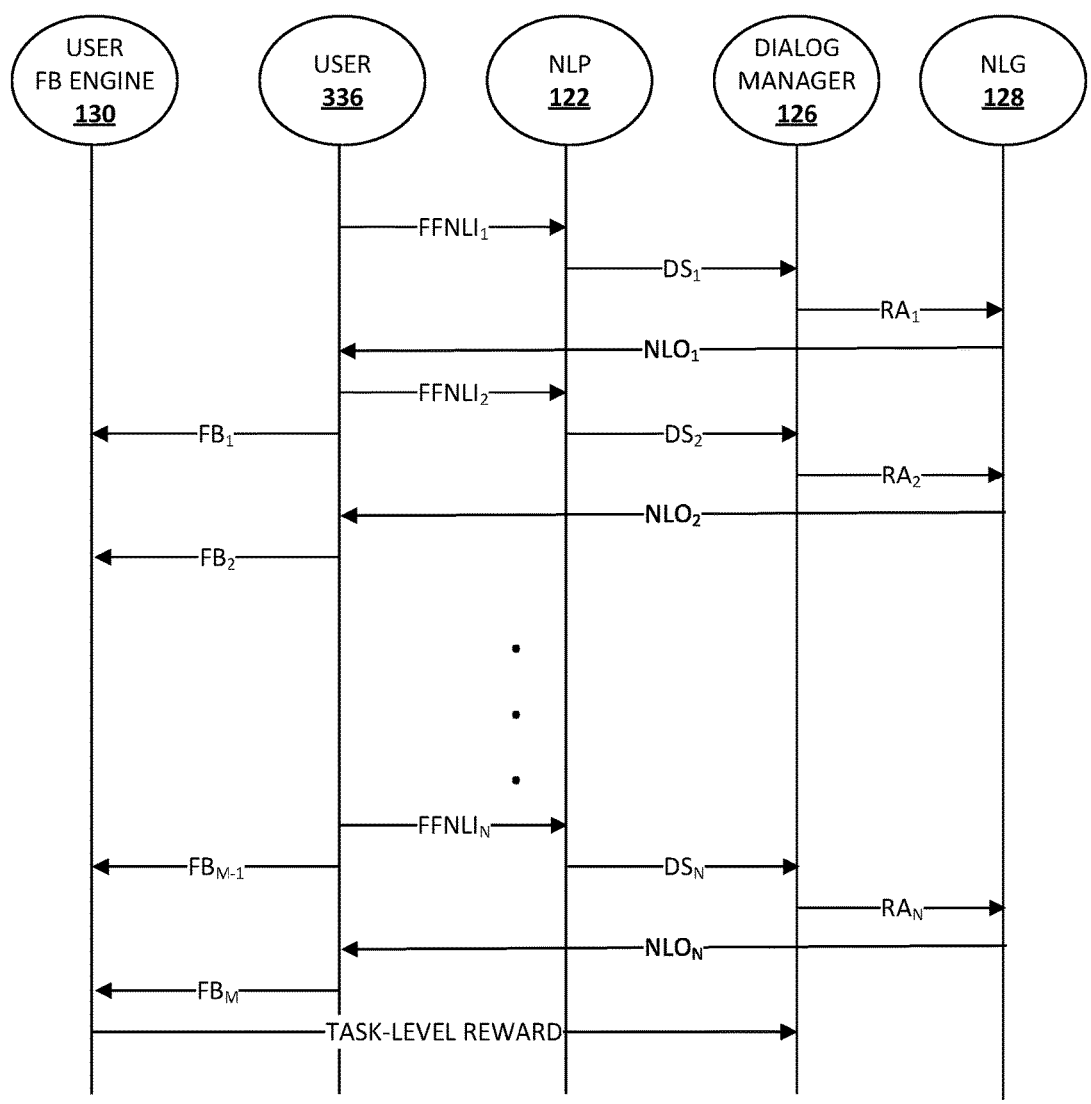
FIG. 3 demonstrates schematically how a human-to-computer dialog session may be analyzed to train a dialog management policy model, in accordance with various implementations.

FIG. 3 schematically depicts one example of how a human-to-computer dialog may be analyzed according to techniques described herein. For this example, assume that time runs down the page. At the outset, a user 336 provides natural language processor ("NLP") 122 with a first instance of free-form natural language input, FFNLI$_1$. Natural language processor 122 may, e.g., in combination with input from dialog state tracker 124 (not depicted in FIG. 3), provide a first dialog state DS$_1$ to dialog manager 126. Based on DS$_1$, dialog manager 126 may sample (i.e. stochastically select), e.g., from database 232 in FIGS. 2A/2B, a first responsive action RA$_1$, which may be provided to natural language generator ("NLG") 128.

In some implementations, to stochastically select a responsive action from a plurality of candidate responsive actions, dialog manager 126 may first generate a plurality of probabilities associated with a plurality of candidate responsive actions, e.g., the entities in database 232. As noted above, in some implementations these probabilities may be generated by applying the dialog state as input across a feedforward neural network, which is trained to implement the policy model $\pi_R$. Then, these probabilities may be evaluated against the turn-level model $\pi_F$ to adjust the probabilities based on turn-level feedback received from one or more users for each of the candidate responsive actions. In some implementations in which turn-level model $\pi_F$ is a lookup table, each dialog state/candidate responsive action pair may be evaluated against a corresponding column/row of turn-level model $\pi_F$ that corresponds to the dialog state/candidate action pair, and a new probability may be calculated (e.g., $\pi_F \times \pi_R$). If the turn-level model $\pi_F$ reveals that a particular dialog state/candidate responsive action pair tends to yield negative turn-level feedback (e.g., there are more instances of negative turn-level feedback than positive), then the corresponding probability output by the feedforward neural network may be diminished, e.g., by a proportionate amount. This makes it less likely that in a given turn, a candidate responsive action that has historically led to negative user feedback will be selected/sampled.

Referring back to FIG. 3, natural language generator 128 may generate/select and provide natural language output, NLO$_1$, to user 336, e.g., via one or more audio or visual output devices of a computing device operated by user 336. While not depicted in FIG. 3, it should be understood that the NLO provided by natural language generator 128 may form only part of a responsive action selected by dialog manager 126. The responsive action may include other actions performed generally by automated assistant, such as filling slots, performing searches, etc.

Next, the user may provide a second instance of input, FFNLI$_2$, to natural language processor 122. In addition to advancing or redirecting the dialog, in some implementations, FFNLI$_2$, may be analyzed as a potential source of turn-level feedback. For example, if FFNLI$_2$ constitutes an affirmation or confirmation, or is directly responsive to NLO$_1$, that may constitute positive turn-level feedback. If FFNLI$_2$ changes the course of the conversation and/or rejects NLO$_1$, that may be constitute negative turn-level feedback. Whichever the case, in various implementations, a turn-level feedback value FB$_1$ may be provided, for instance, to user feedback engine 130. FB$_1$ is depicted as emanating from user 336, which would be the case if the user is also serving as the judge as depicted in FIG. 2A. If a third party judge (238 in FIG. 2B) is present, then the third party judge (not depicted in FIG. 3) may provide FB$_1$. In some cases, if there is insufficient evidence of user reaction to NLO$_1$, then no turn-level feedback may be provided.

A similar back and forth may repeat in response to the user's second instance of input, FFNLI$_2$. Natural language processor 122, e.g., with the assistance of dialog state tracker 124, may generate and provide a dialog state to dialog manager 126. Dialog manager 126 may select a candidate responsive action RA$_2$, e.g., based on probabilities generated using the aforementioned feedforward neural network, adjusted by turn-level feedback indicated in turn-level model $\pi_F$. Natural language generator 128 may generate a second natural language output NLO$_2$ based on RA$_2$, and may provide NLO$_2$ to the user 336 as described above. As indicated by the ellipses, this process may repeat until a final turn (N) of the dialog in which one or more of the user's goal's (G) is satisfied and/or the human-to-computer dialog session is closed. During the dialog session, one or more turn-level feedbacks $FB_{1-M}$ may be obtained and used to adjust turn-level model $\pi_F$. Meanwhile, a task level reward may be generated, e.g., by user feedback engine 130 (as is depicted in FIG. 3) and/or by dialog manager 126, based on satisfaction or dissatisfaction of the user's goal(s) G. Dialog manager 126 may train the feedforward neural network (or whatever other type of model is used) associated with $\pi_R$ as described above using a policy gradient determined from the task-level reward.

Figure 4:
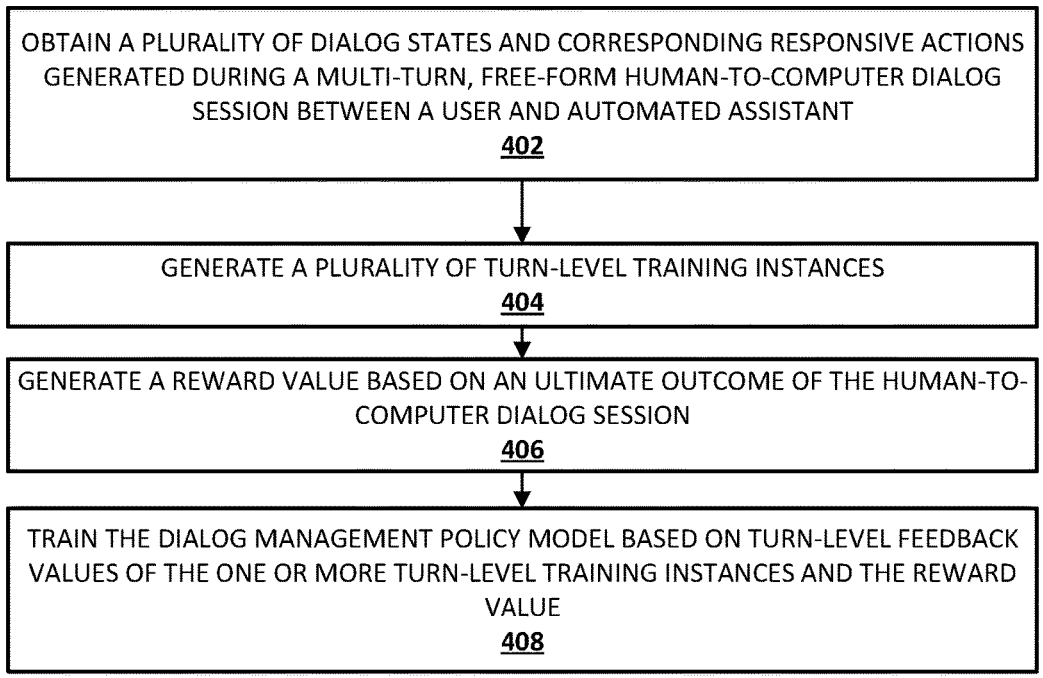
FIG. 4 depicts a flowchart illustrating an example method according to implementations disclosed herein.

FIG. 4 is a flowchart illustrating an example method 400 according to implementations disclosed herein. For convenience, the operations of the flow chart are described with reference to a system that performs the operations. This system may include various components of various computer systems, such as one or more components of computing systems that implement automated assistant 120. Moreover, while operations of method 400 are shown in a particular order, this is not meant to be limiting. One or more operations may be reordered, omitted or added.

At block 402, the system may obtain a plurality of dialog states and corresponding responsive actions generated during a multi-turn, free-form human-to-computer dialog session between a user and automated assistant 120, either during the session in real time or based on conversation log(s). In various implementations, one of the plurality of dialog states may be applied as input across a dialog management policy model (which in some cases may include some combination of $\pi_R$ and $\pi_F$ described above) at each turn of the human-to-computer dialog session to select a corresponding one of the plurality of responsive actions to be performed by the automated assistant. As noted above, at least a portion of the dialog management policy, typically that associated with $\pi_R$, may take the form of a feedforward neural network, although this is not required. Such a neural network may include, for instance, two hidden layers followed by a softmax layer that produces a distribution (i.e., plurality of probabilities) over all candidate responsive actions. In some implementations, input for the neural network may include: (i) user action or dialog act, (ii) previous responsive action, (iii) the dialog state, e.g., a binary vector indicating which slots have been specified by the user, and (iv) the database state encoded as a binary vector and including flags which indicate if the database contains zero, one, two, or three and more responsive actions matching the constraints specified up until the current turn of the dialog.

At block 404, the system may generate (and persist at least temporarily) a plurality of turn-level training instances that are used to train both the turn-level model $\pi_F$ and the overall policy model $\pi_R$. Each turn-level training instance of the plurality of turn-level training instances may include: a given dialog state of the plurality of dialog states at an outset of a given turn of the human-to-computer dialog session; and a given responsive action of the plurality of responsive actions that was selected based on the given dialog state during the given turn. In some implementations, one or more of the plurality of turn-level training instances may further include a turn-level feedback value that reflects on the given responsive action selected during the given turn, assuming turn-level feedback was observed or provided during the turn.

At block 406, the system may generate a reward value based on an ultimate outcome of the human-to-computer dialog session, e.g., satisfaction or dissatisfaction of the user's goal(s). In some implementations, the reward value may be in the range of −1.0 to +1.0, although this is not required. In some implementations, the reward value may be discounted (or "penalized") by a number of turns that occurred during the human-to-computer dialog session. For example, in some implementations, the reward value may be reduced by −0.03 for each turn of the dialog session, to encourage shorter dialog sessions (other penalty values are contemplated herein).

At block 408, the system may train the dialog management policy model based on turn-level feedback values of the one or more turn-level training instances and the reward value. For example, in some implementations, the system may determine a single policy gradient based on the reward value, independently apply each of the turn-level training instances as input across the feedforward neural network model to determine respective output probabilities associated with a plurality of responsive actions, and, for each instance of independently applying, adjust the respective output probabilities based on the single policy gradient. In some implementations, the adjusting may include applying back propagation, e.g., of the reward value or some derivation thereof (e.g., reduced for earlier turns of the dialog session) across the feedforward neural network (i.e., adjusting $\pi_R$). In some implementations, training the dialog management model may further include updating the turn-level model ($\pi_F$) based on the one or more turn-level feedback values associated with the plurality of turn-level training instances.

In various implementations, a dialog management policy model (e.g., $\pi_F$ and $\pi_R$) may be updated globally, e.g., in the cloud, and may be used for a plurality of users. In some such implementations, these updates may occur periodically, e.g., using batch training at various intervals (e.g., every x seconds, minutes, hours, etc.). In other such implementations, these updates may occur at least partially in real time. For example, during any turn of an individual human-to-computer dialog session in which turn-level feedback is observed/provided, the global turn-level model $\pi_F$ may be updated. In some implementations, the dialog management policy model may be updated locally, e.g., on each computing device operated by each user. In some such implementations, these local models may be uploaded and used to update a global dialog management policy that is then propagated to a plurality of users.

Figure 5:
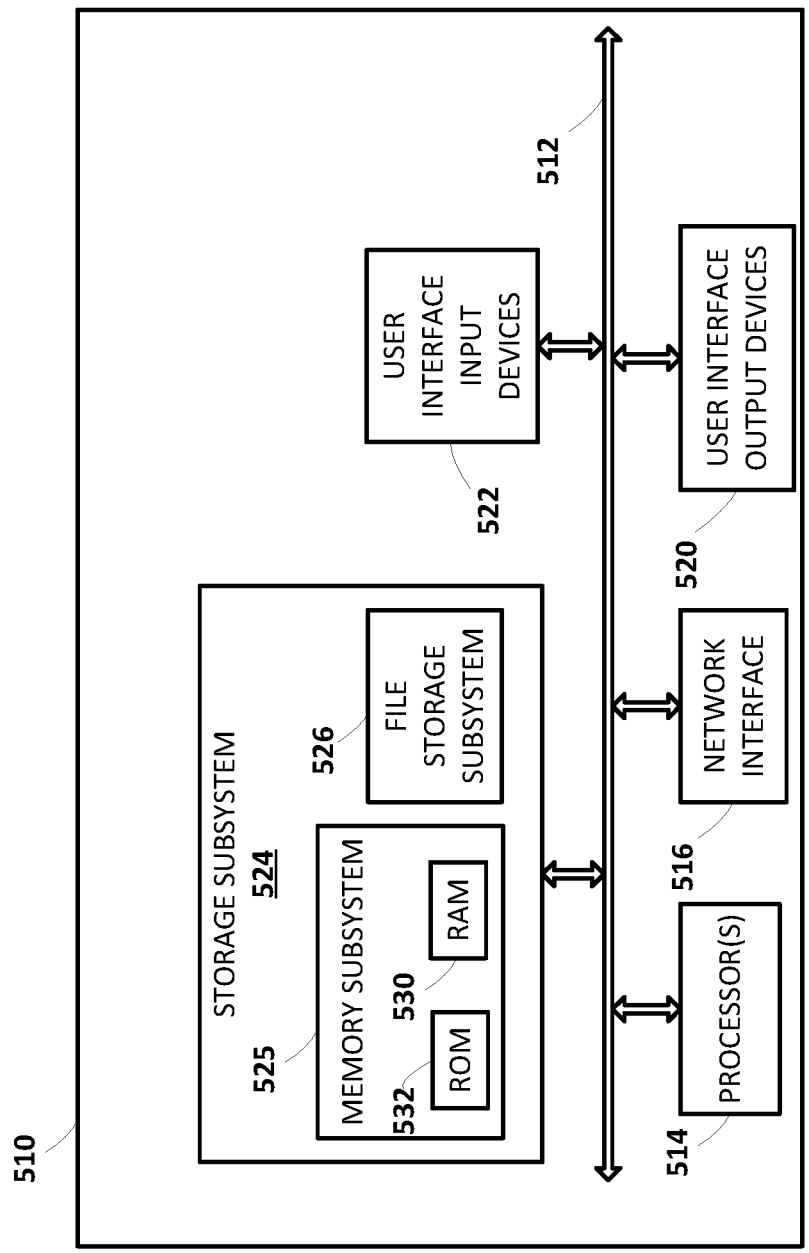
FIG. 5 illustrates an example architecture of a computing device.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the method of FIG. 4, as well as to implement various components depicted in FIG. 1.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:

obtaining a plurality of dialog states and a corresponding plurality of responsive actions generated during a multi-turn, free-form human-to-computer dialog session between a user and an automated assistant, wherein one of the plurality of dialog states is applied as input across a dialog management policy model at each turn of the human-to-computer dialog session to select a corresponding one of the plurality of responsive actions to be performed by the automated assistant, and wherein the dialog management policy model includes a first model that optimizes a reward value based on an ultimate outcome of the human-to-computer dialog session and a second model that comprises a turn-level model;

generating a plurality of turn-level training instances, wherein each turn-level training instance of the plurality of turn-level training instances includes:

a given dialog state of the plurality of dialog states at an outset of a given turn of the human-to-computer dialog session; and a given responsive action of the plurality of responsive actions that was selected based on the given dialog state during the given turn;

wherein one or more of the plurality of turn-level training instances further includes a turn-level feedback value that reflects on the given responsive action selected during the given turn;

generating a reward value based on an ultimate outcome of the human-to-computer dialog session;
training the first model of the dialog management policy model based on the generated reward value; and
updating the turn-level model based on turn-level feedback values of the plurality turn-level training instances;
wherein at each turn of a subsequent human-to-computer dialog session, a subsequent dialog state is applied as input across the first model of the dialog management model network to generate a plurality of probabilities used for stochastic selection of a subsequent responsive action, and the plurality of probabilities are adjusted based on the updated turn-level model before the subsequent responsive action is stochastically selected.

2. The method of claim 1, wherein the reward value is determined based on an indication of whether a task desired by the user was performed as a result of the human-to-computer dialog session and a number of turns that occurred during the human-to-computer dialog session.

3. The method of claim 1, wherein the first model of the dialog management policy model comprises a feedforward neural network.

4. The method of claim 3, wherein the turn-level model is separate from the feedforward neural network.

5. The method of claim 4, wherein training the dialog management policy model comprises:
determining a single policy gradient based on the reward value;
independently applying each of the plurality of turn-level training instances as input across the feedforward neural network to determine respective output probabilities associated with a plurality of responsive actions; and
for each instance of independently applying, adjusting the respective output probabilities based on the single policy gradient.

6. The method of claim 5, wherein the adjusting comprises applying back propagation across the dialog management model.

7. The method of claim 1, wherein the turn-level feedback value is indicative of a reaction by the user to the given responsive action.

8. The method of claim 1, wherein the reward value is generated further based on the one or more feedback values associated with the plurality of turn-level training instances.

9. A system comprising one or more processors and memory operably coupled with the one or more processors, wherein the memory stores instructions that, in response to execution of the instructions by one or more processors, cause the one or more processors to perform the following operations:
obtaining a plurality of dialog states and a corresponding plurality of responsive actions generated during a multi-turn, free-form human-to-computer dialog session between a user and an automated assistant, wherein one of the plurality of dialog states is applied as input across a dialog management policy model at each turn of the human-to-computer dialog session to select a corresponding one of the plurality of responsive actions to be performed by the automated assistant, and wherein the dialog management policy model includes a first model that optimizes a reward value based on an ultimate outcome of the human-to-computer dialog session and a second model that comprises a turn-level model;
generating a plurality of turn-level training instances, wherein each turn-level training instance of the plurality of turn-level training instances includes:
a given dialog state of the plurality of dialog states at an outset of a given turn of the human-to-computer dialog session; and
a given responsive action of the plurality of responsive actions that was selected based on the given dialog state during the given turn;
wherein one or more of the plurality of turn-level training instances further includes a turn-level feedback value that reflects on the given responsive action selected during the given turn;
generating a reward value based on an ultimate outcome of the human-to-computer dialog session;
training the first model of the dialog management policy model based on the generated reward value; and
updating the turn-level model based on turn-level feedback values of the plurality of turn-level training instances;
wherein at each turn of a subsequent human-to-computer dialog session, a subsequent dialog state is applied as input across the first model of the dialog management model network to generate a plurality of probabilities used for stochastic selection of a subsequent responsive action, and the plurality of probabilities are adjusted based on the updated turn-level model before the subsequent responsive action is stochastically selected.

10. The system of claim 9, wherein the reward value is determined based on an indication of whether a task desired by the user was performed as a result of the human-to-computer dialog session and a number of turns that occurred during the human-to-computer dialog session.

11. The system of claim 9, wherein the first model of the dialog management policy model comprises a feedforward neural network.

12. The system of claim 11, wherein the turn-level model is separate from the feedforward neural network.

13. The system of claim 12, wherein training the dialog management model comprises:
determining a single policy gradient based on the reward value;
independently applying each of the plurality of turn-level training instances as input across the feedforward neural network to determine respective output probabilities associated with a plurality of responsive actions; and
for each instance of independently applying, adjusting the respective output probabilities based on the single policy gradient.

14. The system of claim 13, wherein the adjusting comprises applying back propagation across the dialog management model.

15. The system of claim 9, wherein the turn-level feedback value is indicative of a reaction by the user to the given responsive action.

16. At least one non-transitory computer-readable medium comprising instructions that, in response to execution of the instructions by one or more processors, cause the one or more processors to perform the following operations:
obtaining a plurality of dialog states and a corresponding plurality of responsive actions generated during a multi-turn, free-form human-to-computer dialog session between a user and an automated assistant, wherein one of the plurality of dialog states is applied as input across a dialog management policy model at each turn of the human-to-computer dialog session to select a corresponding one of the plurality of responsive actions to be performed by the automated assistant, and wherein the dialog management policy model includes a first model that optimizes a reward value based on an ultimate outcome of the human-to-computer dialog session and a second model that comprises a turn-level model;

generating a plurality of turn-level training instances, wherein each turn-level training instance of the plurality of turn-level training instances includes:
- a given dialog state of the plurality of dialog states at an outset of a given turn of the human-to-computer dialog session; and
- a given responsive action of the plurality of responsive actions that was selected based on the given dialog state during the given turn;
- wherein one or more of the plurality of turn-level training instances further includes a turn-level feedback value that reflects on the given responsive action selected during the given turn;

generating a reward value based on an ultimate outcome of the human-to-computer dialog session;

training the first model of the dialog management policy model based on the generated reward value;

updating the turn-level model based on turn-level feedback values of the plurality of turn-level training instances;

wherein at each turn of a subsequent human-to-computer dialog session, a subsequent dialog state is applied as input across the first model of the dialog management model network to generate a plurality of probabilities used for stochastic selection of a subsequent responsive action, and the plurality of probabilities are adjusted based on the updated turn-level model before the subsequent responsive action is stochastically selected.

* * * * *